(12) United States Patent
Agrawal et al.

(10) Patent No.: US 6,879,576 B1
(45) Date of Patent: Apr. 12, 2005

(54) METHOD AND APPARATUS FOR PROCESSING A PHYSICAL CHANNEL WITH PARTIAL TRANSPORT FORMAT INFORMATION

(75) Inventors: Avneesh Agrawal, San Jose, CA (US); Daisuke Terasawa, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 406 days.

(21) Appl. No.: 09/655,609

(22) Filed: Sep. 6, 2000

(51) Int. Cl.[7] .................................. H04B 7/216
(52) U.S. Cl. .................. 370/342; 370/441; 375/130
(58) Field of Search ................ 370/342, 203, 370/204, 206, 208, 310, 320, 328, 334, 335, 441, 479, 503, 509, 515, 522; 375/130, 136, 137, 140, 141, 147, 149, 150

(56) References Cited

U.S. PATENT DOCUMENTS

| | | | |
|---|---|---|---|
| 4,901,307 A | * | 2/1990 | Gilhousen et al. .......... 370/320 |
| 5,103,459 A | * | 4/1992 | Gilhousen et al. .......... 370/206 |
| 6,088,324 A | * | 7/2000 | Sato .......................... 370/203 |
| 6,215,814 B1 | * | 4/2001 | Ylitalo et al. ............... 375/148 |
| 6,222,875 B1 | * | 4/2001 | Dahlman et al. ........... 375/130 |
| 6,240,282 B1 | * | 5/2001 | Kleider et al. ............ 455/226.1 |
| 6,532,250 B1 | * | 3/2003 | Palenius et al. ............ 375/141 |
| 6,580,747 B1 | * | 6/2003 | Lipponen ................... 375/140 |

FOREIGN PATENT DOCUMENTS

| | | | |
|---|---|---|---|
| WO | 9636132 | 11/1996 | ........... H04B/1/707 |
| WO | 9903225 | 1/1999 | ........... H04J/13/04 |
| WO | 0150620 | 12/2000 | ........... H04B/1/707 |

* cited by examiner

*Primary Examiner*—Brian Nguyen
(74) *Attorney, Agent, or Firm*—Philip Wadsworth; Charles D. Brown; Howard H. Seo

(57) ABSTRACT

Techniques for recovering data transmitted on a physical channel in which the channelization code is not known at the time of the data recovery. A modulated signal is received an processed to provide received samples. A hypothesized channelization code (e.g., an OVSF code in the W-CDMA system) is selected and used to process the received samples to generate partially processed symbols. The hypothesized channelization code is a "base" code that can be used to generate all possible channelization codes that may have been used for the physical channel. Intermediate results representative of the partially processed symbols are stored and, upon determination of the actual channelization code, further processed in accordance with the actual and hypothesized channelization codes to provide the final results.

19 Claims, 10 Drawing Sheets

METHOD AND APPARATUS FOR PROCESSING A PHYSICAL CHANNEL WITH PARTIAL TRANSPORT FORMAT INFORMATION

BACKGROUND OF THE INVENTION

I. Field of the Invention

The present invention relates to data communication. More particularly, the present invention relates to a novel and improved method and apparatus for processing a physical channel with partial transport format information.

II. Description of the Related Art

A modern day communications system is required to support a variety of applications. One such communications system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

A CDMA system is typically designed to conform to one or more standards. One such first generation standard is the "TIA/EIA/IS-95 Remote Station-Base Station Compatibility Standard for Dual-Mode Wideband Spread Spectrum Cellular System," hereinafter referred to as the IS-95 standard and incorporated herein by reference. IS-95 compliant CDMA systems are able to transmit voice data and packet data. A newer generation standard is offered by a consortium named "$3^{RD}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard and incorporated herein by reference.

The W-CDMA standard defines a channel structure capable of supporting a number of users and designed for efficient transmission of packet data. In accordance with the W-CDMA standard, a user is typically assigned a "dedicated" channel on the downlink (i.e., from the base station to the user) and the uplink (i.e., from the user to the base station) for the duration of the call. The dedicated channel can be used for voice communication or transmission of small amounts of packet data, and thus has a (relatively) low bit rate. When the base station has a large amount of data to transmit, a "shared" channel may be assigned and used for the data transmission. The shared channel is allocated and de-allocated to users as needed.

The shared channel has a structure that supports a variety of uses and a bit rate that can be varied between a range of values (e.g., from 15 kbps up to 1.92 Mbps). The shared channel bit rate can also be dynamically changed from radio frame to radio frame, with each radio frame being a unit of transmission covering 15 time slots and each time slot corresponding to 0.667 msec.

In accordance with the W-CDMA standard, certain information necessary to properly recover the data transmitted on the shared channel is provided on the dedicated channel assigned to the user. For example, in certain instances, the bit rate of the radio frame and the channelization code (akin to the Walsh code in the IS-95 CDMA system) used to channelize the shared channel a re provided on the dedicated channel at approximately the same time as the data transmission on the shared channel. Consequently, the receiver unit is not able to process and recover the data on the shared channel in real-time.

Thus, techniques that can be used to efficiently process a physical channel, such as the shared channel in the W-CDMA system, when some characteristics of the physical channel are not known are highly desirable.

SUMMARY OF THE INVENTION

The present invention provides techniques to process a physical channel in which at least some of the information needed to fully process the physical channel is not available at the time of processing. In accordance with the invention, for a parameter that is unknown (e.g., a channelization code), a determination is made as to the possible values for that parameter. A hypothesized parameter value is then selected and used to process the physical channel to provide intermediate results, which require less storage than the unprocessed samples. The hypothesized parameter value is selected such that the intermediate results can further be processed, when the actual parameter value is known, to obtain the final results.

Certain aspects of the invention are especially suited for processing a received signal that has been processed and transmitted in accordance with a space time block coding transmit antenna diversity (STTD) mode defined by the W-CDMA standard. For some data transmissions in the W-CDMA system, the actual channelization code may not be known at the time of the data recovery at the receiver unit. For these data transmissions, a hypothesized channelization code can be used to partially process the received samples, to reduce the amount of data to be stored before the actual channelization code can be determined. The hypothesized channelization code is a fraction of, and can be used to generate the actual channelization code.

An aspect of the invention provides a method for recovering data transmitted on a physical channel in which a channelization code used for the physical channel is not known at the time of the data recovery. In accordance with the method, a modulated signal is received and processed to provide samples. A hypothesized channelization code is then selected and used to process the samples to generate partially processed symbols. Intermediate results representative of the partially processed symbols are stored and, upon determination of an actual channelization code used for the physical channel, further processed in accordance with the actual and hypothesized channelization codes to provide the final results.

The hypothesized channelization code is a "base" code that can be used to generate all possible channelization codes that may have been used to process the physical channel. The hypothesized channelization code has a length that is shorter or equal to that of the actual channelization code. For a W-CDMA system, the hypothesized channelization code can be an orthogonal variable spreading factor (OVSF) code and can have a spreading factor of four or greater (e.g., four to 512). However, it is advantageous to use a hypothesized OVSF code having the largest possible spreading factor among the OVSF codes that can be used to generate all possible actual OVSF codes.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
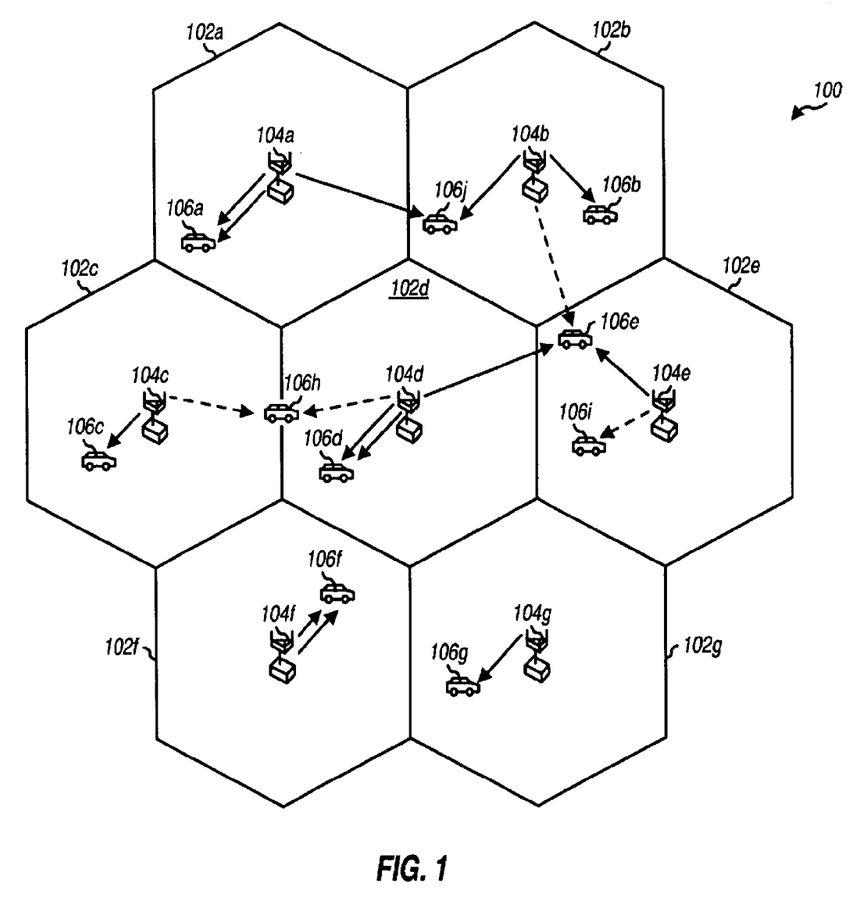
FIG. 1 is a diagram of a spread spectrum communications system that supports a number of users.

FIG. 1 is a diagram of a spread spectrum communications system 100 that supports a number of users. System 100 provides communication for a number of cells 102a through 102g, with each cell 102 being serviced by a corresponding base station 104. Various remote stations 106 are dispersed throughout the system. In an embodiment, each remote station 106 communicates with one or more base stations 104 on the downlink and uplink at any given moment, depending on whether the remote station is in soft handoff. The downlink refers to transmission from the base station to the remote station, and the uplink refers to transmission from the remote station to the base station. The downlink and uplink respectively correspond to the forward link and reverse link in the IS-95 CDMA system. System 100 may be designed to support one or more CDMA standards, such as the IS-95 standard, the W-CDMA standard, other standards, or a combination thereof.

As shown in FIG. 1, base station 104a transmits data to remote stations 106a and 106j on the downlink, base station 104b transmits data to remote stations 106b and 106j, base station 104c transmits data to remote station 106c, and so on. In FIG. 1, the solid line with the arrow indicates a transmission from the base station to the remote station. A broken line with the arrow indicates that the remote station is receiving the pilot signal, but no user-specific data transmission, from the base station. The uplink communication is not shown in FIG. 1 for simplicity.

In certain transmission modes in the W-CDMA standard, a remote station can receive multiple transmissions from multiple antennas of a single base station for certain physical channel types including the (physical) downlink shared channel (DSCH). As shown in FIG. 1, remote station 106a receives multiple transmissions from base station 104a, remote station 106d receives multiple transmissions from base station 104d, and remote station 106f receives multiple transmissions from base station 104f.

Figure 2:
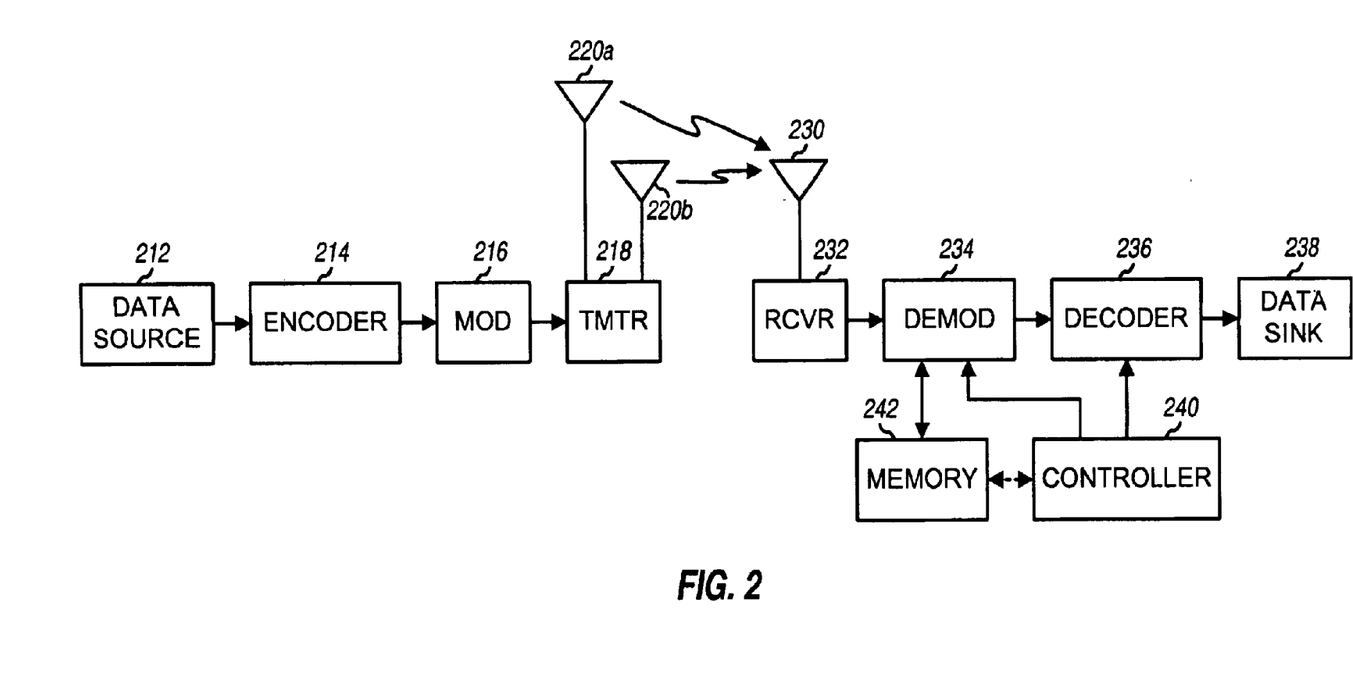
FIG. 2 is a simplified block diagram of an embodiment of the signal processing for a downlink physical channel.

FIG. 2 is a simplified block diagram of an embodiment of the signal processing for a downlink physical channel. At the transmitter unit, data is sent, typically in packets, from a data source 212 to an encoder 214. Encoder 214 performs a number of functions, depending on the particular CDMA system or standard being implemented. Such encoding functions typically include formatting each data packet with the necessary control fields, cyclic redundancy check (CRC) bits, and code tail bits. Encoder 214 then encodes one or more formatted packets with a particular coding scheme and interleaves (or reorders) the symbols within the encoded packets. Encoder 214 also performs rate matching of the packet (e.g., by repeating or puncturing the data).

The interleaved packet is provided to a modulator (MOD) 216 and may be scrambled with a scrambling sequence (for an IS-95 CDMA system), covered with a channelization code, and spread with spreading codes (e.g., short PNI and PNQ codes). The spreading with the spreading codes is referred to as "scrambling" by the W-CDMA standard. The channelization code can be an orthogonal variable spreading factor (OVSF) code (for a W-CDMA system), a Walsh code (for an IS-95 CDMA system), or some other orthogonal code, again depending on the particular CDMA system or standard being implemented. The spread data is then provided to a transmitter (TMTR) 218 and quadrature modulated, filtered, and amplified to generate one or more downlink signals. The downlink signal(s) are transmitted over the air from one or more antennas 220. The downlink processing is described in further detail in the IS-95 and W-CDMA standards.

At the receiver unit, the downlink signal(s) are received by an antenna 230 and routed to a receiver (RCVR) 232. Receiver 232 filters, amplifies, quadrature demodulates, and samples and quantizes the received signal. The digitized samples are then provided to a demodulator (DEMOD) 234 and despreaded (or descrambled) with despreading codes, may be descrambled with a descrambling code (for the IS-95 CDMA system), and decovered with a channelization code for each physical channel being processed. The despreading, descrambling, and channelization codes correspond to the codes used at the transmitter unit. The demodulated data is then provided to a decoder 236 that performs the inverse of the functions performed at encoder 214 (e.g., the de-interleaving, decoding, and CRC check functions). The decoded data is provided to a data sink 238.

A controller 240 can direct the operation of demodulator 234 and decoder 236. A memory unit 242 couples to demodulator 234 (and possibly also to controller 240, as indicated by the dashed line) and, in certain modes of operation, can be used to store intermediate results, or data, from demodulator 234.

The block diagram, as described above, supports transmissions of packet data, messaging, voice, video, and other types of communication on the downlink. A bi-directional communications system also supports uplink transmission from the remote station to the base station. However, the uplink processing is not shown in FIG. 2 for simplicity.

Figure 3A:
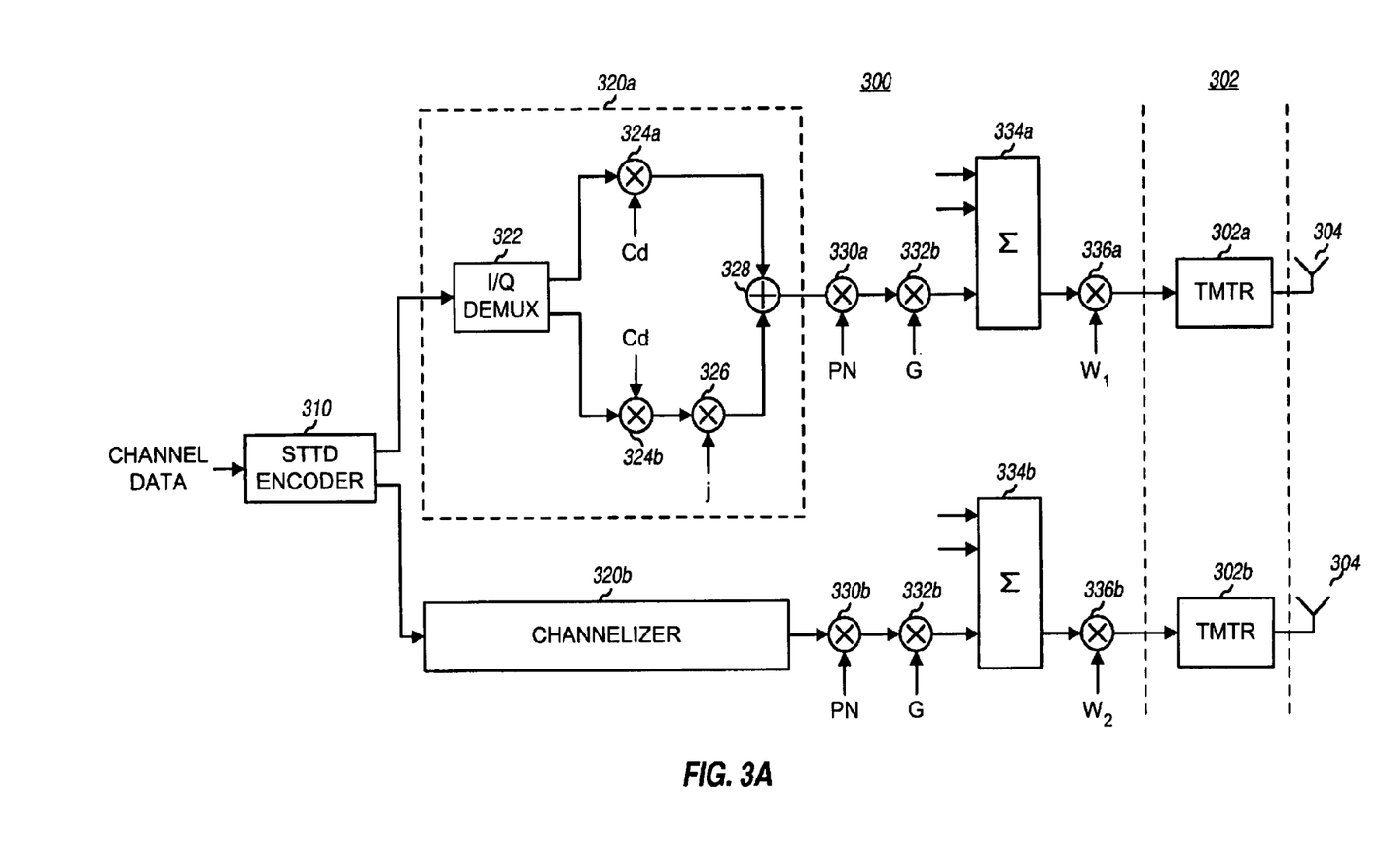
FIG. 3A is a block diagram of a modulator, a transmitter, and antennas that support transmission of a physical channel over two antennas.

FIG. 3A is a block diagram of a modulator 300, a transmitter 302, and antennas 304 that support transmission of a physical channel over two antennas. The processing units shown in FIG. 3A can be used to support a space time block coding transmit antenna diversity (STTD) mode defined by the W-CDMA standard. The data for the physical channel (i.e., the channel data) is provided to a STTD encoder 310 that generates STTD encoded data for each of the antennas used to transmit the channel data. The operation of STTD encoder 310 is described in further detail below. The STTD encoded data for each antenna is provided to a respective channelizer 320 that covers the data with a channelization code assigned to the physical channel to generate "channelized" data. In the W-CDMA system, the same channelization code is used for both antennas.

Covering is used to channelize data such that the data on multiple physical channels can be optimally transmitted and received without interfering with each other. Each physical channel is assigned a particular channelization code selected from a set of channelization codes. The codes in the set are typically designed to be orthogonal with each other such that a particular code multiplied with itself and integrated over the length of the code will result in a high (energy) value, but if multiplied with other codes in the set and integrated over the code length will result in a low (or ideally, zero) value. Non-orthogonal channelization codes can also be used for the covering.

To perform covering, the channel bits to be transmitted are multiplied with the assigned channelization code. At the receiver, the transmitted bits are recovered by multiplying the received samples with the same code used to cover the bit and integrating over the length of the code. Only the bit that had been covered with the code used for decovering will result in a high value, and the bits from other physical channels that had been covered with other codes will integrate to a value close to zero.

Within channelizer 320, the STTD encoded data is provided to an I/Q demultiplexer (DEMUX) 322 that demultiplexes the data into inphase (I) and quadrature (Q) data. The I data and Q data are provided to respective multipliers 324a and 324b and covered (i.e., multiplied) with the channelization code, Cd, assigned to the physical channel. Multipliers 324a and 324b perform covering using the channelization code in similar manner as the covering performed with Walsh code in the IS-95 CDMA system.

For an IS-95 CDMA system, Walsh codes having a fixed length of 64 chips are used to cover the traffic channels, with each physical channel having a variable but limited data rate (e.g., $\leq$32 kbps). W-CDMA uses orthogonal codes called OVSF codes that are identical to Walsh codes except that the index identifying the code is bit-reversed (e.g., for a length 64 code, Walsh code (64,5) (5=b000101) would be OVSF code (64,40) (40=b101000)). W-CDMA uses OVSF codes with length that varies from 4 to 512 chips and is dependent on the data rate of the physical channel. OVSF codes are described in further detail below.

The covered Q data from multiplexer 324b is provided to a multiplexer 326 and multiplied with the complex symbol, j, to generate the imaginary part of the channelized data. The real part from multiplexer 324a and the imaginary part from multiplexer 326 are combined by an adder 328 to provide the complex channelized data. The channelized data for each antenna is then scrambled with a complex scrambling code, PN, by a multiplier 330a and scaled with a weight factor, G, by a multiplier 332b. The weight factor, G, is selected for the physical channel being processed and is used to adjust the transmit power of the physical channel.

The scrambled and weighted data from multiplier 332b, the scrambled and weighted data for other physical channels, and other data for some others physical channels (e.g., the common control physical channel) are combined by an adder 334 to generate composite data. The composite data for each antenna is further multiplied with a complex weight factor, W, by a multiplier 336. As specified in the W-CDMA standard, the weight factor is used for phase adjustment in closed loop mode 1 and for phase/amplitude adjustment in closed loop mode 2.

The adjusted data from each multiplier 336 is then provided to a respective transmitter 302 that converts the data into an RF modulated signal, which is then transmitted from a respective antenna 304.

Figure 3B:
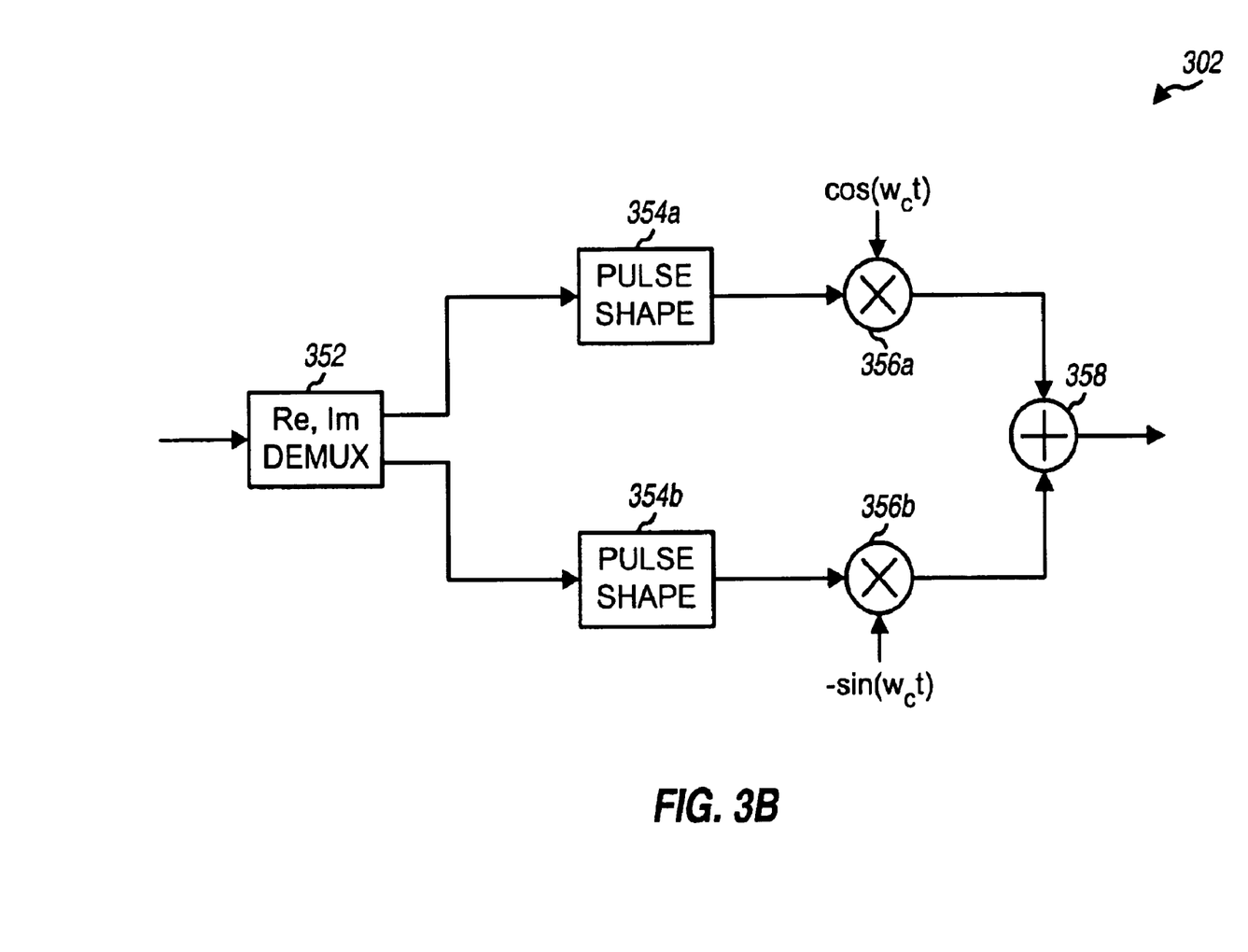
FIG. 3B is a block diagram of an embodiment of a portion of the transmitter.

FIG. 3B is a block diagram of an embodiment of a portion of transmitter 302. The composite data from modulator 300, having complex-values, is provided to a real/imaginary demultiplexer (Re/Im DEMUX) 352 that demultiplexes the data into the real and imaginary parts. The real and imaginary parts are then filtered by respective pulse shape filters 354a and 354b. The filtered real and imaginary parts are modulated with respective carrier signals $\cos(\omega_c t)$ and $-\sin(\omega_c t)$ by multipliers 356a and 356b to generate inphase and quadrature modulated components that are then combined by an adder 358 to generate a modulated signal. The modulated signal is typically conditioned prior to transmission from antenna 304.

Figure 4A:
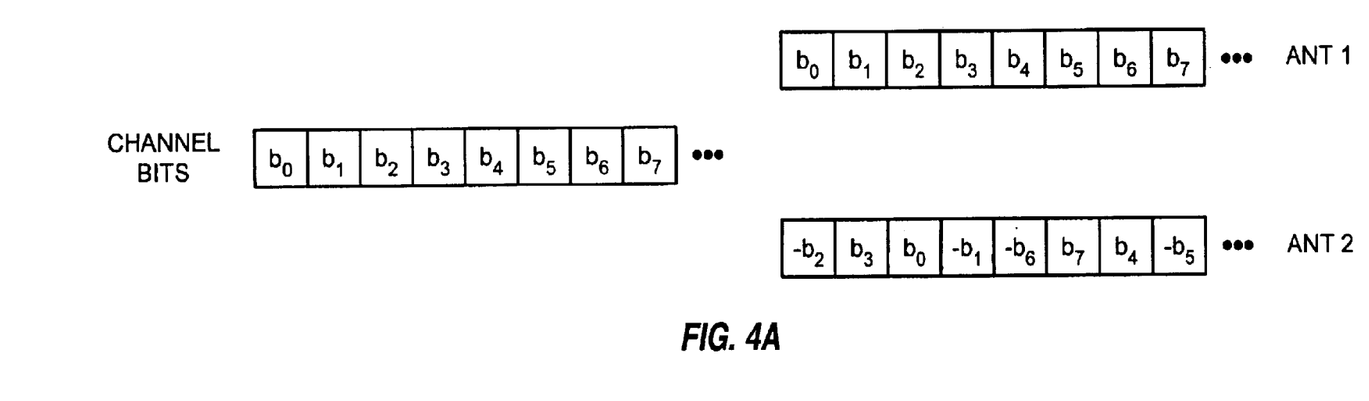
FIGS. 4A and 4B are diagrams that illustrate the encoding performed by an STTD encoder using bit notation and complex notation, respectively.

FIG. 4 is a diagram that illustrates the encoding performed by STTD encoder 310. The channel data comprises a sequence of bits represented as $\{b_0, b_1, b_2, b_3, b_4, b_5, b_6, b_7, \ldots\}$. In the STTD mode of the W-CDMA system, the input bit sequence is transmitted from two or more antennas. For example, each antenna can be substituted by a phased array antenna consisting of multiple antennas having a particular beam pattern. The STTD scheme is designed for two diverse paths (regardless of the number of physical antennas employed).

STTD encoder 310 receives the input bit sequence and generates a number of output bit sequences, one output bit sequence for each antenna used to transmit the channel data (two output bit sequences are generated in the example shown in FIG. 4A). In accordance with the W-CDMA standard, the first output bit sequence for antenna 1 is a replica of the input bit sequence, and the second output bit sequence for antenna 2 contain the same bits, but the order of the bits is rearranged in time and some of the bits are inverted.

The STTD encoding to generate the second output bit sequence is performed by first partitioning the input bit sequence into blocks of four bits. The bit in the third bit position of each block (e.g., $b_2$) is swapped with the bit in the first bit position (e.g., $b_0$), and the bit in the fourth bit position (e.g., $b_3$) is swapped with the bit in the second bit position (e.g., $b_1$). The bits in the first and fourth bit positions in the block (e.g., $b_1$ and $b_2$) are also inverted in the second output bit sequence.

Figure 4B:
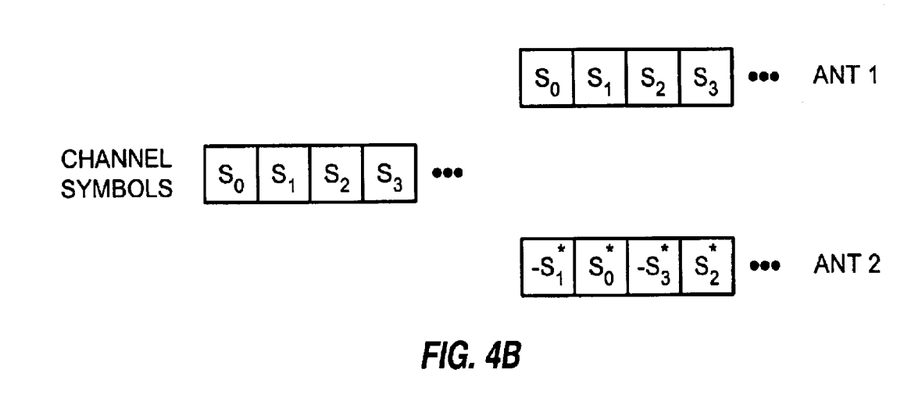

FIG. 4B is a diagram that illustrates the encoding performed by STTD encoder 310 using complex notation. Prior to transmission, the output bit sequences from STTD encoder 310 are provided to respective transmitters. In each transmitter, the bit sequence is demultiplexed into an inphase (I) sequence and a quadrature (Q) sequence. For antenna 1, the transmitter input bit sequence $\{b_0, b_1, b_2, b_3, b_4, b_5, b_6, b_7, \ldots\}$ is demultiplexed into the I sequence $\{b_0, b_2, b_4, b_6, \ldots\}$ and the Q sequence $\{b_1, b_3, b_5, b_7, \ldots\}$. The I and Q sequences for antenna 1 can also be viewed as a complex symbol sequence $\{S_0, S_1, S_2, S_3, \ldots\}$, where $S_0 = b_0 + jb_1$, $S_1 = b_2 + jb_3$, and so on.

Similarly, for antenna 2, the transmitter input bit sequence $\{-b_2, b_3, b_0, b_1, -b_6, b_7, b_4, -b_5, \ldots\}$ is demultiplexed into the I sequence $\{-b_2, b_0, -b_6, b_4, \ldots\}$ and the Q sequence $\{b_3, -b_1, b_7, -b_5, \ldots\}$. The I and Q sequences for antenna 2 can be viewed as a complex symbol sequence $\{-S_1^*, S_0^*, -S_3^*, S_2^*, \ldots\}$, where $-S_1^* = -b_2 + jb_2$, $S_0^* = b_0 - jb_3$, and so on. $S_0^*$ represents the complex conjugate of $S_0$.

Transmission of the channel data over two or more antennas provides spatial diversity, which can improve performance against deleterious path effects. Rearranging the order of the bits in at least one of the transmissions provides temporal diversity, which can improve performance against impulse noise and interference. The bit inversion is used to allow the receiver unit to separate out the streams from the two antennas and consequently take advantage of the path diversity.

In accordance with the W-CDMA standard, the downlink shared channel (DSCH) can be used to transmit data at a variable bit rate ranging from 15 Kbps up to 1.92 Mbps. For the W-CDMA standard, the bit rate refers to the rate of the bits provided to modulator 216, i.e., after encoding, interleaving, and rate matching but before covering, spreading, and so on. The OVSF codes used to cover (and channelize) the data has a fixed chip rate (i.e., 3.84 Mcps for W-CDMA) but a variable length ranging from four chips to 512 chips. The length of the OVSF code is also referred to as the spreading factor, SF. Table 1 lists the bit rates (in Kbps) supported by W-CDMA and the corresponding OVSF code lengths (in chips).

TABLE 1

| Channel Bit Rate (Kbps) | OVSF Code Length (chips) |
|---|---|
| 15 | 512 |
| 30 | 256 |
| 60 | 128 |
| 120 | 64 |
| 240 | 32 |
| 480 | 16 |
| 960 | 8 |
| 1920 | 4 |

As shown in Table 1, the OVSF code has a maximum length of 512 chips for the lowest supported bit rate of 15 Kbps and a minimum length of 4 chips for the highest supported bit rate of 1.92 Mbps.

Figure 5:
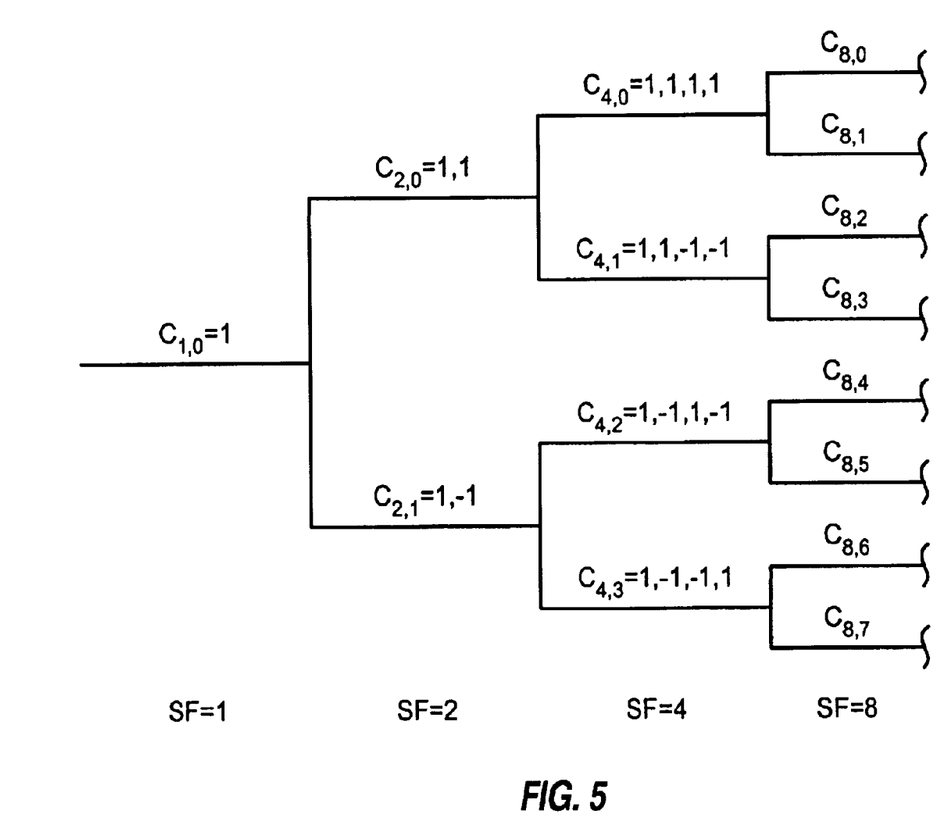
FIG. 5 is a diagram that illustrates the generation of the OVSF codes.

FIG. 5 is a diagram at illustrates the generation of the OVSF codes. Each OVSF code can be identified by the designation, $C_{SF,i}$, where SF is the spreading factor (which is equal to the length of the code) and i is the identity of the particular code (i.e., i=0, 1, 2, ... SF-1) for that spreading factor. The OVSF codes are "structured" codes, and successively longer OVSF codes can be generated from shorter OVSF codes in accordance with a set of rules. To generate OVSF codes of a longer length (i.e., $C_{2x}$), each immediately shorter length OVSF code (i.e., $C_x$) is used to generate two new OVSF codes. The first new OVSF code is generate by repeating the shorter length OVSF code twice (i.e., $C_{2x,2i} = C_{x,i}, C_{x,i}$), and the second new OVSF code is generate by repeating the shorter length code twice and inverting the second repetition (i.e., $C_{2x,2i+1} C_{x,i}, -C_{x,2}$).

As shown in FIG. 5, only one OVSF code is defined for a code length of one (i.e., $C_{1,0}=1$). Two OVSF codes are defined for a code length of two (i.e., $C_{2,0}=1,1$ and $C_{2,1}=1,-1$), and are generated from the OVSF code of length 1 (i.e., $C_{1,0}$). Similarly, four OVSF codes are defined for a code length of four, with the OVSF codes ($C_{4,0}=1,1,1,1$) and ($C_{4,2}=1,-1,1,-1$) being generated from the OVSF code ($C_{2,0}=1,1$) and the OVSF codes ($C_{4,3}=1,-1,1,-1$) and ($C_{4,3}=1,-1,-1,1$) being generated from the OVSF code ($C_{2,1}=1,-1$).

In accordance with the W-CDMA standard, each user in communication with the base station is typically assigned a dedicated channel (DCH) on the downlink and may be assigned/allocated a downlink shared channel (DSCH) as needed for packet data transmission. The parameters for the dedicated channel are either negotiated or may be known to the receiver unit at the time communication is established. For example, for the dedicated channel, the channelization code is known but other parameters such as rate matching parameters may or may not be known. If the parameters are not known at the time communication is established, a transport format combination indication (TFCI) is used t indicate the unknown transport format.

However, in part because of the dynamic nature of the downlink shared channel, its channelization code is typically not known a priori but provided instead on the dedicated channel. The transport format includes various parameters associated with the downlink shared channel such as, for example, the particular OVSF code assigned to the channel, the bit rate, and so on. The transport format of the downlink shared channel and the transport formats of other physical channels are combined into a transport format combination (TFC) and encoded into a TFCI that is transmitted to the receiver unit on the dedicated channel. The TFCI and its coding and transmission are described in detail in the W-CDMA standard.

Upon detection of the TFCI in the dedicated channel, the receiver unit is able to determine the transport formats for the individual physical channels, including that of the downlink shared channel. The receiver unit is then able to demodulate and decode the downlink shared channel.

In some instances, the TFCI is transmitted on the dedicated channel approximately concurrently with the data transmission on the downlink shared channel. Furthermore, because of the processing delay to demodulate and decode the dedicated channel, the TFCI may not be known until a short time after reception of the data transmission on the shared channel. The transport format information necessary to demodulate and decode the shared channel may therefore not be available in real-time. The invention provides techniques to efficiently process the data transmission when the actual OVSF code is not known.

Figure 6:
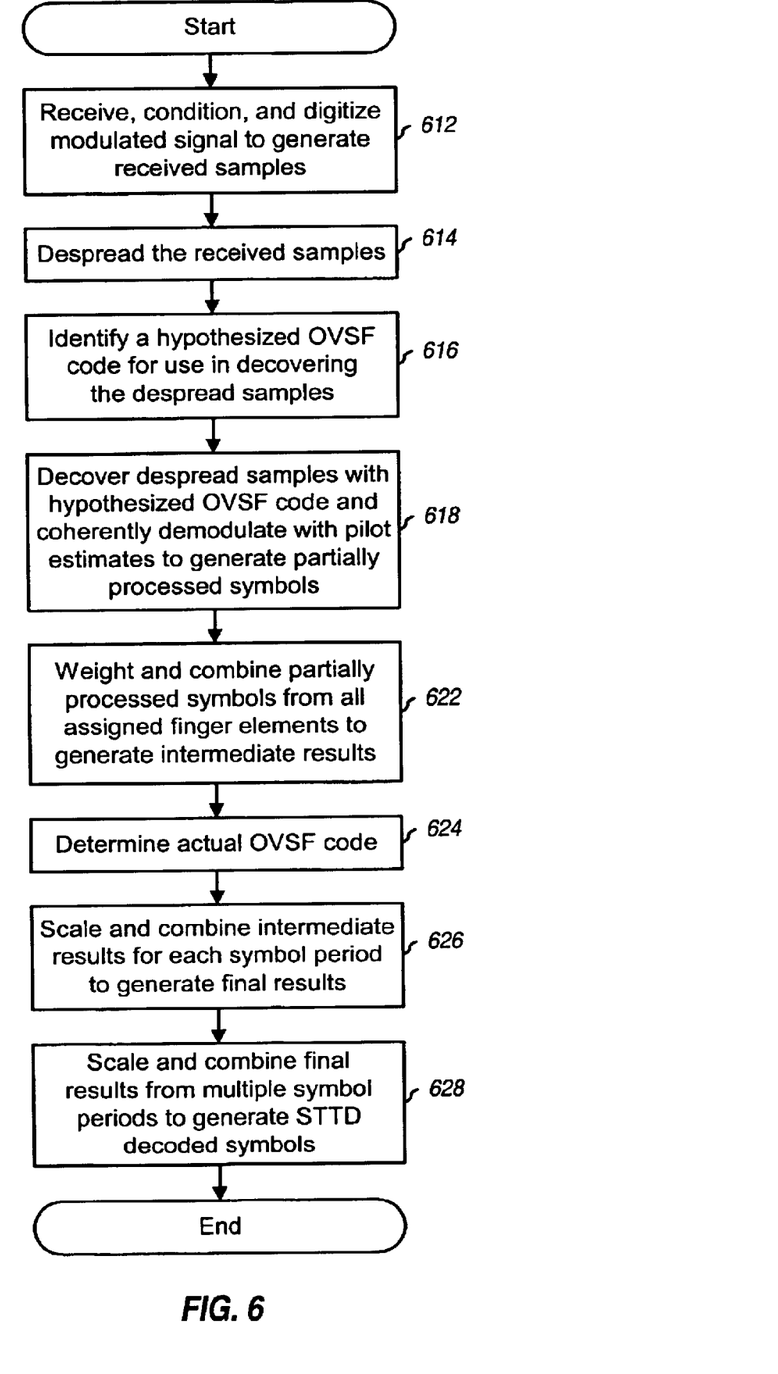
FIG. 6 is a flow diagram of the processing of a modulated (spread spectrum) signal in accordance with an embodiment of the invention.

FIG. 6 is a flow diagram of the processing of a modulated (spread spectrum) signal in accordance with an embodiment of the invention. Initially, the modulated signal is received, conditioned, and digitized to generate samples, at step 612. The samples may thereafter be processed by a number of finger elements, with each finger element assigned to process a particular signal path (i.e., multipath) of the received signal.

For each finger element, the samples are despread with a PN sequence at a time offset corresponding to the multipath being processed, at step 614. A hypothesized OVSF code is then identified for use in decovering the despread samples, at step 616. The hypothesized OVSF code is a code that can be used to generate the actual OVSF code used to cover the data at the base station, and is described in further detail below. If the received signal is from more than one base station and different actual OVSF codes are used at the transmitting base stations, then different hypothesized OVSF codes may be used for different finger elements.

For each finger element, the despread samples are then decover with the hypothesized OVSF code, and may further be coherently demodulated with pilot estimates, if available, to generate partially processed symbols, at step 618. The partially processed symbols represent a portion of the actual symbol or the entire actual symbol, depending on the relationship between the hypothesized and actual OVSF codes, as described in further detail below. The partially processed symbols from all assigned finger elements are then appropriately weighted and combined to generate combined symbols, or intermediate results, at step 622. The intermediate results may be stored to a buffer until the actual OVSF code is known.

At step 624, the actual OVSF code is determined. The intermediate results may then be retrieved from the buffer and further processed. Specifically, the intermediate results for each symbol period (i.e., each actual OVSF code length) are scaled and combined to generate the final result for that symbol period, at step 626. The scaling is dependent on the relationship between the hypothesized and actual OVSF codes, as described below. The final result represents an estimate of the transmitted symbol. For STTD decoding in the W-CDMA system, the final results from multiple symbol periods are scaled and combined, in a complementary manner to the STTD encoding performed at the base station, to generate recovered symbols, at step 628. The processing shown in FIG. 6 is described in further detail below.

Figure 7:
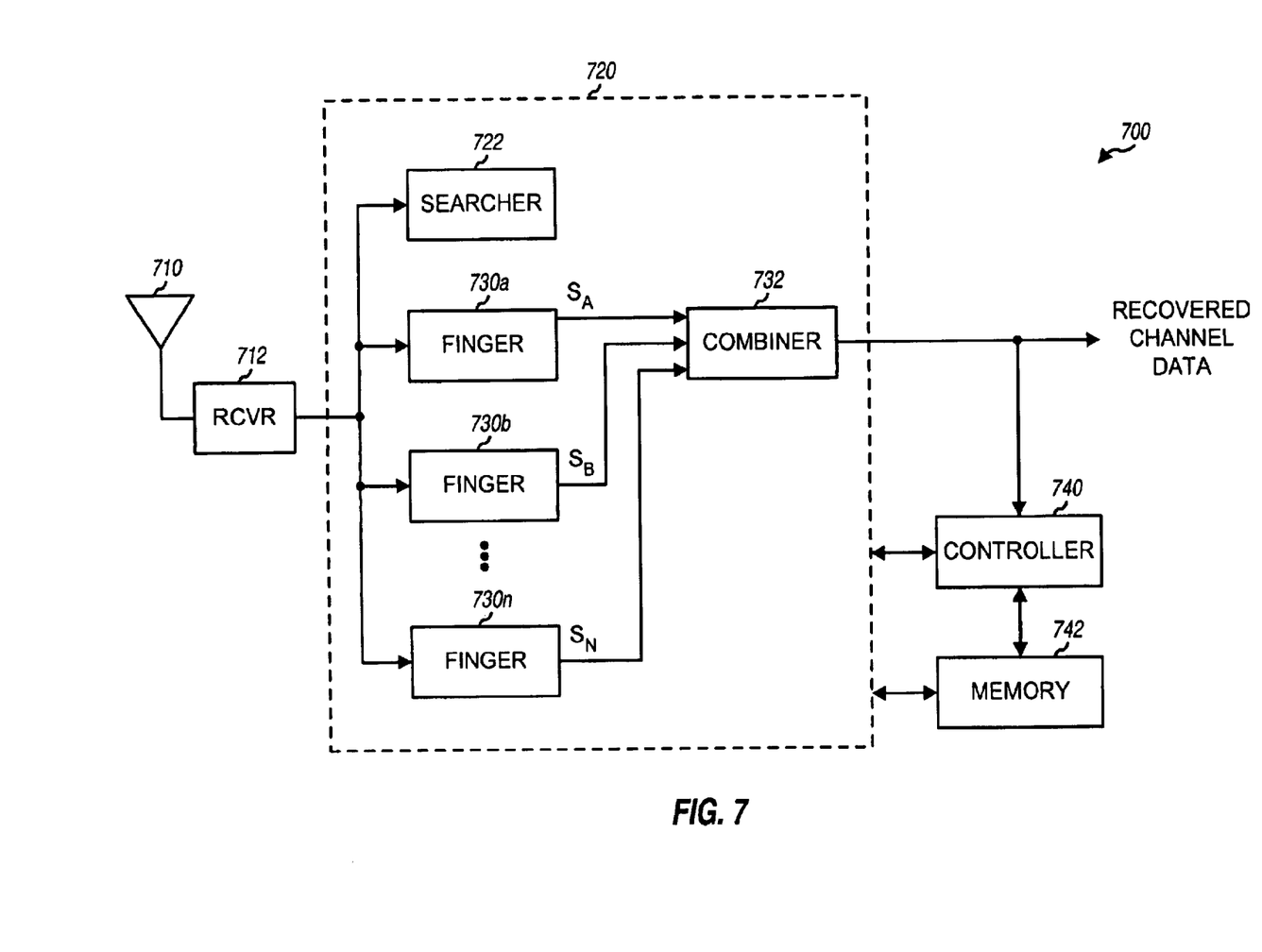
FIG. 7 is a block diagram of an embodiment of a portion of a receiver unit that can be used to receive and demodulate a physical channel, including one transmitted from multiple transmit antennas in the STTD mode of the W-CDMA standard.

FIG. 7 is a block diagram of an embodiment of a portion of a receiver unit 700 that can be used to receive and demodulate a physical channel, including one transmitted from multiple transmit antennas in the STTD mode of the W-CDMA standard. One or more RF modulated signals from one or more transmit antennas are received by an antenna 710 and provided to a receiver (RCVR) 712 that conditions (e.g., amplifies, filters, and so on) the received signal and quadrature downconverts the conditioned signal to an intermediate frequency (IF) or baseband. Receiver 712 also samples and quantizes the downconverted inphase and quadrature signals to generate received samples that are then provided to a rake receiver 720. Although a rake receiver is shown in FIG. 7 for processing the physical channel, other receiver structures and implementations can also be used and are within the scope of the present invention.

In typical implementations, the received signal is sampled at a sample rate, $f_s$, that is higher than the chip rate, $f_c$, of the received signal. For example, the chip rate may be $f_c=1.2288$ Mcps for the IS-95 CDMA system (or 3.84 Mcps for the W-CDMA system) but the sample rate may be, for example, 8 times (i.e., 8×chip), 16 times (i.e., 16×chip), 32 times (i.e., 32×chip), or other multiple of the chip rate. The higher sample rate allows for fine adjustment of the timing to "zoom in" on a path position.

As shown in FIG. 7, rake receiver 720 includes a searcher element 722 and a number of finger elements 730a through 730n. Each of these elements receives the samples from receiver 712 and performs the tasks associated with the element or as directed by a controller 740. For example, searcher element 722 may be instructed by controller 740, or assigned to search for strong instances of the received signal. The strong signals may be present at different time offsets, and can be identified by searcher element 722 by processing the samples with different parameters (e.g., different PN codes, different time offsets, and so on). Searcher 722 may be designed to provide data corresponding to the searched signal or an indication of the search result to controller 740. Controller 740 assigns finger elements 730 to demodulate the strongest instances of the received signal, as determined with the assistance of searcher element 722.

Each assigned finger element 730 performs demodulation of one physical channel for one instance of the received signal (i.e., a signal at a particular assigned time offset), as directed by controller 740. When the channelization code is known, each assigned finger element 730 provides recovered symbols (e.g., $S_A$) corresponding to the assigned instance of the received signal. The recovered symbols from all assigned finger elements 730 are then provided to a combiner 732 and combined to provide composite symbols that are more indicative of the transmitted data. The combined symbols represent the recovered channel data, and are provided to the subsequent processing block (e.g., the decoder).

In accordance with the invention, in instances where the channelization code is not known, each assigned finger element 730 provides partially processed symbols corresponding to the assigned instance of the received signal (i.e., the assigned signal path). Each partially processed symbol can represent one recovered symbol or a fraction of one recovered symbol, depending on a hypothesized channelization code used to process the received samples and the actual channelization code. The partially processed symbols from various assigned finger elements 730 may also be combined to provide combined symbols more indicative of the transmitted data. The combined symbols from the combiner represent "intermediate results" that can be provided to, and stored by, a memory 742. The intermediate results are later retrieved and may further be processed, when the actual channelization code is known, to provide the recovered symbols representative of the recovered channel data. Processing with the hypothesized channelization code and post-processing of the intermediate data are described in further detail below.

The design and operation of a rake receiver for an CDMA system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS," both assigned to the assignee of the present invention and incorporated herein by reference.

Although not shown in FIG. 7 for simplicity, each finger element can also include a lock detector that computes a quality indicator (e.g., an average energy) of the recovered data at the finger element and masks the partially processed symbols from the finger element if the quality indicator does not exceed a minimum threshold. The masking ensures that only finger elements receiving signal of sufficient strength and reliability will contribute to the combined output, thus enhancing the quality of the recovered data.

Figure 8:
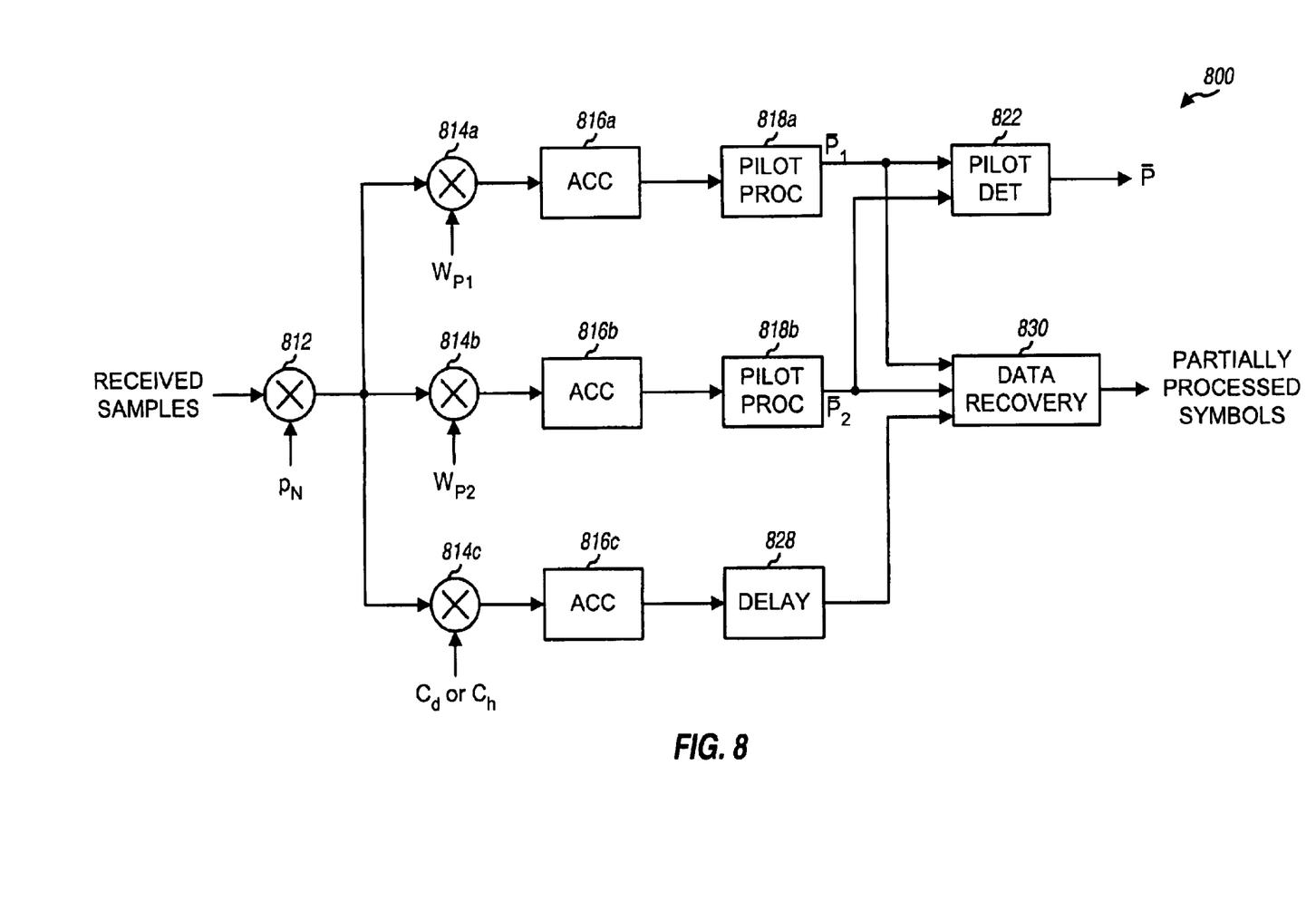
FIG. 8 is a block diagram of an embodiment of a finger element that can be used to implement one of the finger elements in FIG. 7.

FIG. 8 is a block diagram of an embodiment of a finger element 800 that can be used to implement one finger element 730 in FIG. 7. The finger element is also referred to as a demodulation element. The received samples from C, receiver 712 are provided to a multiplier 812 and descrambled with a complex descrambling code, PN, corresponding to the scrambling code used at the transmitter unit and having a time offset assigned to the finger element. The descrambled samples are then provided to a set of multipliers 814a through 814c.

The descrambled samples include data for all physical channels in the received signal, including pilot data, control data, and data transmitted on the dedicated and shared channels. Separation of these various types of data is achieved at the transmitter unit by (1) channelizing each channel data with an OVSF code assigned for the particular channel, (2) time multiplexing the data, or (3) a combination of both.

In accordance with the W-CDMA standard, for closed loop mode 1, orthogonal pilots are used for the two transmit antennas. The orthogonal pilots for the two antennas are generated by using different symbol patterns, $W_{p1}$ and $W_{p2}$. Thus, at the receiver unit, the pilots are recovered by multipliers 814a and 814b using the same symbol patterns, $W_{p1}$, and $W_{p2}$. The pilot samples from multipliers 814a and 814b are then provided to respective accumulators 816a and 816b and accumulated over the length of the symbol patterns to obtain values indicative of the instantaneous phase and amplitude of the pilots. The instantaneous pilot values from accumulators 816a and 816b are then provided to respective pilot processors 818a and 818b.

The received pilot data is filtered and processed (e.g., interpolated or extrapolated, depending on the type of signal processing employed) to generate pilot estimates, $\overline{P}_1$ and $\overline{P}_2$, used to demodulate the data. The despread pilot samples may also be provided to a pilot detector (DET) 822 that provides an indication of the quality of the received pilots. In a specific implementation, pilot detector 822 measures the power of the received pilots and provides a pilot quality estimate, $\overline{P}$.

In similar manner, the descrambled samples from multiplier 812 are provided to a multiplier 814c and decovered with either the actual OVSF code, $C_d$, (if it is known) or a hypothesized OVSF code, $C_h$, (if the actual OVSF code is not known) to recover the data on the physical channel. The samples from multiplier 814c are then provided to an accumulator 816c and accumulated over the length of the OVSF code, $C_d$ or $C_h$, used to decover the samples. If the actual OVSF code, $C_d$, for the physical channel being processed is known, accumulator 816c accumulates the samples over the length of the code to generate a received symbol. For example, referring back to Table 1, if the bit rate of the physical channel is 1.92 Mbps, accumulator 816c accumulates the samples over a four-chip period to provide a received symbol. On the other extreme, if the bit rate of the physical channel is 7.5 kbps, accumulator 816c accumulates the samples over a 512-chip period to provide a received symbol. The decovered symbols from accumulator 816c may be delayed by a delay element 828 to match the delay of pilot processors 818.

In accordance with the invention, when the actual OVSF code is not known, the decovering is performed using the hypothesized OVSF code, $C_h$, having a spreading factor that may be less than that of the actual OVSF code. The accumulation by accumulator 816c is then performed for a time period corresponding to the length of the hypothesized OVSF code. Thus, each decovered symbols from accumulator 816c may be only a portion of an actual received symbol.

The pilot estimates, $\overline{P}_1$ and $\overline{P}_2$, from pilot processors 818a and 818b and the decovered symbols from delay element 828 are provided to a data recovery element 830 that performs the necessary computations to generate the partially processed symbols for the finger element. In particular, data recovery element 830 may perform a dot product and a cross product between the pilot estimates and the decovered symbols to generate the partially processed symbols. The dot and cross products refer to the operations $X_I P_I + X_Q P_Q$ and $X_I P_Q - X_Q P_I$, respectively, where the I and Q components of the decovered data symbol are respectively $X_I$ and $X_Q$, and the I and Q components of the estimated pilot are respectively $P_I$ and $P_Q$. The data recovery process may further involve rotation and/or scaling of either or both of the decovered data symbol and estimated pilot, as is known to those skilled in the art.

In FIG. 8, multipliers 814a and 814b, accumulators 816a and 816b, and pilot processors 818a and 818b may be referred to as the pilot processing unit of the finger element. For a mode in which pilot data is transmitted from only one antenna, only one of the pilot processing paths is needed and the other pilot processing path can be disabled. Multiplier 814c, accumulator 816c, and delay element 828 may be referred to as the data processing unit of the finger element.

The physical channel being processed may be transmitted from one antenna or two antennas (e.g., for the STTD mode in the W-CDMA system). Moreover, the physical channel may be modulated using either BPSK modulation (e.g., for an IS-95 CDMA system) or QPSK modulation (e.g., for a W-CDMA system).

In the STTD mode of the W-CDMA system, two RF modulated signals are transmitted from two transmit antennas for one physical channel. Each of the RF modulated signals can experience independent and different path loss. The received signal is thus a weighted sum of the two RF modulated signals, and can be expressed as:

$$X = \alpha S_{A1} + \beta S_{A2},$$

where X is the received symbol sequence $\{X_0, X_1, X_2, X_3, \ldots\}$, $S_{A1}$ is the symbol sequence $\{S_0, S_1, S_2, S_3, \ldots\}$ transmitted from the first transmit antenna, $S_{A2}$ is the symbol sequence $\{-S_1^*, S_0^*, -S_3^*, S_2^*, \ldots\}$ transmitted from the second transmit antenna, and $\alpha$ and $\beta$ are the fading coefficients for the two paths. The received symbols can be expressed as:

$$X_0 = \alpha S_0 - \beta S_1^*, \quad \text{Eq (1)}$$

$$X_1 = \alpha S_1 + \beta S_0^*, \quad \text{Eq (2)}$$

$$X_2 = \alpha S_2 - \beta S_3^*, \quad \text{Eq (3)}$$

$$X_3 = \alpha S_3 + \beta S_2^*, \quad \text{Eq (4)}$$

Equations 1 through 4 assume that the signals transmitted from antennas 1 and 2 are received at the finger element at approximately equal time, which is generally true in many instances. If the two paths are not received at the same time, then there may be some small degradation in performance, but the equations give above are still valid and the processing described herein can still be applied.

Because of time multiplexing of the symbols transmitted on the second transmit antenna, the received symbol sequence $\{X_0, X_1, X_2, X_3, \ldots\}$ are further processed to recover the transmitted symbol sequence $\{S_0, S_1, S_2, S_3, \ldots\}$. To determine an estimate of the transmitted symbol $S_0$, equations 1 and 2 may be scaled and combined as follows:

$$\begin{aligned}\overline{S}_0 &= \overline{\alpha}^* X_0 + \overline{\beta} X_1^* \\ &= \overline{\alpha}^*(\alpha S_0 - \beta S_1^*) + \overline{\beta}(\alpha S_1 + \beta S_0^*)^* \\ &= \overline{\alpha}^* \alpha S_0 + \overline{\beta}(\beta S_0^*)^* - \overline{\alpha}^* \beta S_1 + \overline{\beta}(\alpha S_1)^* \\ &= (|\alpha|^2 + |\beta|^2) S_0 + \text{noise}\end{aligned}$$

where $\overline{S}_0$ is the recovered symbol, $\overline{\alpha}$ and $\overline{\beta}$ are complex-valued estimates of the path losses (i.e., channel or fading coefficient) from the first and second transmit antennas, respectively, to the receive antenna. The noise term is due to imperfect channel estimation. Since the pilots are also transmitted from both transmit antennas, and the pilot data value is known, the pilot estimates described above can be used as the channel estimates, $\bar{\alpha}$ and $\bar{\beta}$, in the above equations. Similarly, to determine an estimate of the transmitted symbol $S_1$, equations 1 and 2 may be scaled and combined as follows:

$$\begin{aligned}\bar{S}_1 &= -\bar{\beta}X_0^* + \bar{\alpha}^*X_1 \\ &= -\bar{\beta}^*(\alpha S_0 - \beta S_1^*)^* + \bar{\alpha}^*(\alpha S_1 + \beta S_0^*) \\ &= (|\alpha|^2 + |\beta|^2)S_1 + \text{noise}\end{aligned}$$

Thus, the recovered symbols, $\bar{S}_0$ and $\bar{S}_1$, can be computed as:

$$\bar{S}_0 = (\bar{\alpha}^*X_0 + \bar{\beta}X_1^*), \text{ and} \qquad \text{Eq (5)}$$

$$\bar{S}_1 = (-\bar{\beta}X_0^* + \bar{\alpha}X_1). \qquad \text{Eq (6)}$$

To recover the data transmitted on the physical channel, it is necessary to decover the descrambled samples with the same OVSF code, $C_d$, used to channelize the physical channel at the transmitter. However, as noted above, the bit rate for the shared channel in the W-CDMA system is variable and the bit rate for a particular radio frame is provided on the dedicated channel, which may be transmitted approximately concurrently with the data.

Several techniques can be used to recover the data on a physical channel (such as the downlink shared channel in the W-CDMA system) having a variable but unknown bit rate (i.e., unknown OVSF code). In one technique, the descrambled samples are stored to memory and later retrieved for processing when information on the physical channel is known. Because of various factors (e.g., the size of the radio frame, the high bit rate, the higher resolution used to represent the unprocessed samples, and so on), a large memory is required to store the unprocessed samples. Also, descrambled samples are stored for all assigned finger elements.

In another technique, the descrambled data can be decovered for all possible OVSF codes (or all OVSF codes possible with the physical channel being processed). For example, the descrambled data can be decovered for OVSF code $C_{4,0}=1,1,1,1$, OVSF code $C_{4,1}=1,1,-1,-1$, and so on, concluding with OVSF code $C_{512,511}=1,-1,-1,1,-1,1,1, -1, \ldots$ Since there are almost 1024 possible OVSF codes, the brute force processing for all possible OVSF codes can be extensive and the implementation cost may be high. Thus, other techniques that can reduce the amount of necessary buffering and/or computation are highly desirable.

In accordance with the invention, if the actual OVSF code is not known, a hypothesized OVSF code is used to process the received samples. The actual OVSF code is the code that was actually used to channelize the physical channel being processed. Initially, a set of all OVSF codes that can be used to generate all possible actually used OVSF codes is determined. The OVSF code with the largest spreading factor within this set can then be selected as the hypothesized OVSF code. The hypothesized OVSF code is thus a "base" OVSF code that can be used to generate all possibilities of the actual OVSF code. The code tree for generating the OVSF codes has a known structure and this property of the OVSF code is exploited in the present invention. If the actual OVSF code is known to be a member of a set of possible codes, then the hypothesized OVSF code with the largest spreading factor that can be used to generate the possible codes in the set is used to decover the data.

For example, referring back to FIG. 5, if the actual OVSF code has a spreading factor of 4 and it is known that the code is either $C_{4,0}$ or $C_{4,3}$, then the OVSF code $C_{2,0}$ can be used to process the physical channel since $C_{2,0}$ can be used to generate $C_{4,0}$ and $C_{4,1}$. As another example, if the actual OVSF code is known to be a member of a set that includes $C_{8,0}$ to $C_{8,3}$ and $C_{16,0}$ to $C_{16,7}$, then the OVSF code $C_{2,0}$ can be used to process the physical channel. If the actual OVSF code is known to be a member of a smaller code set that includes $C_{8,2}$ to $C_{8,3}$ and $C_{16,4}$ to $C_{16,7}$, then the OVSF code $C_{4,1}$ having a larger spreading factor can be used to process the physical channel. The OVSF code selected for use to process the physical channel is referred to as the hypothesized OVSF code.

For a clearer understanding of the invention, the processing of the received samples using a hypothesized OVSF code is now described for a specific example. In this example, the hypothesized OVSF code is half the length of the actual OVSF code.

Figure 9:
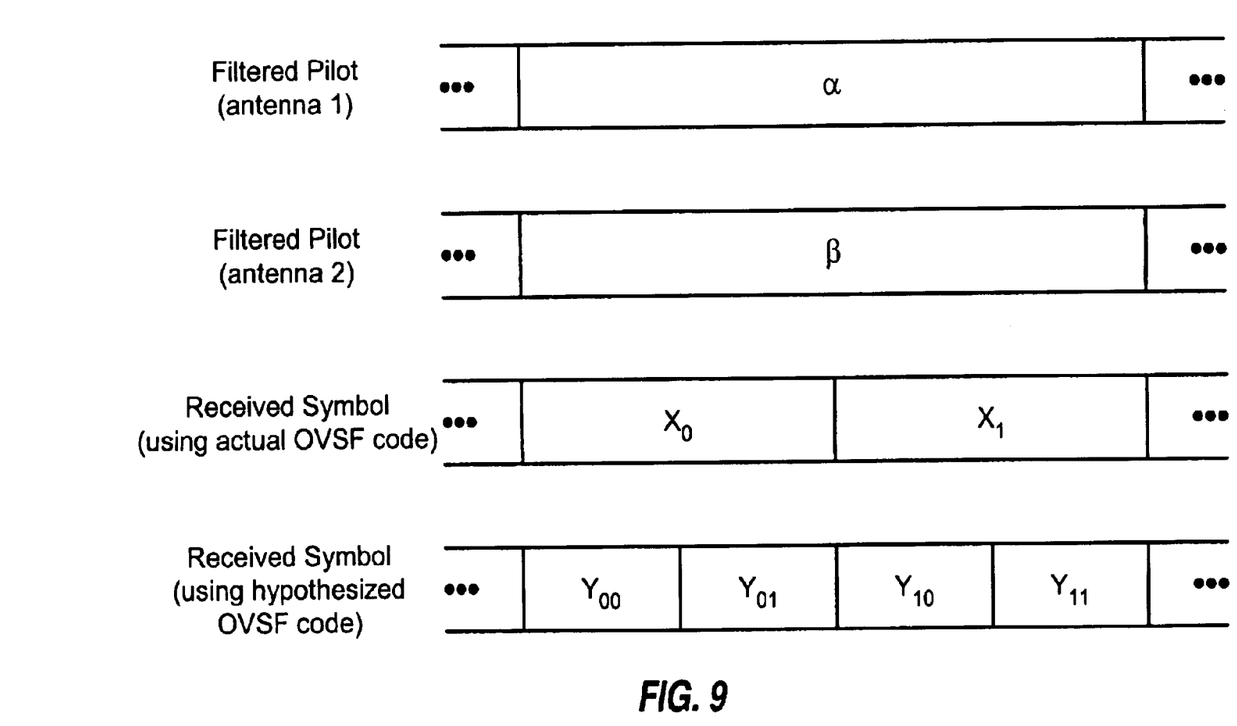
FIG. 9 is a diagram that illustrates the processing of two symbols using an actual OVSF code and a hypothesized OVSF code.

FIG. 9 is a diagram that illustrates the processing of two symbols using the actual OVSF code and the hypothesized OVSF code. In this example, the filtered pilot received from the first antenna is denoted as a, the filtered pilot received from the second antenna is denoted as $\alpha$, the received symbols processed using the actual OVSF code are denoted as $X_0$ and $X_1$, and the received symbols processed using the hypothesized OVSF code are denoted as $Y_{00}$, $Y_{01}$, $Y_{10}$, and $Y_{12}$. Since the hypothesized OVSF code is half the length of the actual OVSF code, two symbols $Y_{a0}$ and $Y_{a1}$ are generated for each symbol $X_4$.

If the actual OVSF code is known, the following terms can be computed for each finger element assigned to process a particular signal path:

$\alpha^*X_0$, $\alpha^*X_1$, $\alpha X_0^*$, and $\alpha X_1^*$,.

The terms from all assigned finger elements can be appropriately weighted and combined to obtain the following terms:

$\overline{a^*X_0}$, $\overline{\alpha^*X_1}$, $\overline{\beta X_0^*}$, and $\overline{\beta X_1^*}$,.

where the symbol "" denotes the weighted sum for a particular term (e.g., $\alpha^*$ $X_0$) across all assigned finger elements. For the STTD mode in the W-CDMA system, the transmitted symbols $S_0$ and $S_1$ can then be determined as:

$S_0 = \overline{\alpha^*X_0} + \overline{\beta X_1^*}$, and $S_1 = -\overline{\beta X_0^*} + \overline{\alpha^*X_1}$.

However, if the actual OVSF code is not known, a hypothesized OVSF code can be generated and used for processing the received samples. For each assigned finger element, the following terms can be computed using the hypothesized OVSF code:

$\alpha^*Y_{00}, \alpha^*Y_{01}$, $\alpha^*Y_{10}, \alpha^*Y_{11}$, $\beta Y_{00}^*, \beta Y_{01}^*$, and $\beta Y_{10}^*, \beta Y_{11}^*$.

Since the actual OVSF code is twice the length of the hypothesized OVSF code in this example, two pairs of partially processed symbols are generated for each transmitted symbol. The terms from all assigned finger elements can be appropriately weighted and combined to obtain the following terms:

$\overline{\alpha^*Y_{00}}, \overline{\alpha^*Y_{01}}$, $\overline{\alpha^*Y_{10}}, \overline{\alpha^*Y^{11}}$, $\overline{\beta Y_{00}^*}, \overline{\beta Y_{01}^*}$, and $\overline{\beta Y_{10}^*}, \overline{\beta Y_{11}^*}$.

The above terms represent intermediate results that can be stored in a memory the actual OVSF code is determined.

Once the actual OVSF code is known, the intermediate results can be retrieved from memory and appropriated combined as follows:

$$\overline{\alpha^*X_0} = \overline{\alpha^*Y_{00}} + \overline{\alpha^*Y_{01}},$$
$$\overline{\alpha^*X_1} = \overline{\alpha^*Y_{10}} + \overline{\alpha^*Y_{11}},$$
$$\overline{\beta X_0^*} = \overline{\beta Y_{00}^*} + \overline{\beta Y_{01}^*}, \text{ and}$$
$$\overline{\beta X_1^*} = \overline{\beta Y_{10}^*} + \overline{\beta Y_{11}^*}.$$

In the above example, a plus sign ("+") is used to combine the two "Y" terms to generate each "X" term. However, the "Y" terms may be scaled differently prior to the combining, with each "Y" term being scale with either a +1 or −1 depending on how the hypothesized OVSF code is scaled and concatenated to obtain the actual OVSF code. The transmitted symbols $S_0$ and $S_1$ can then be determined in similar manner described above, as follows:

$$S_0 = \overline{\alpha^*X_0} + \overline{\beta X_1^*}, \text{ and}$$
$$S_1 = -\overline{\beta X_0^*} + \overline{\alpha^*X_1}.$$

As illustrated by the above example, equations (5) and (6) cannot be executed in its entirety with the hypothesized OVSF code because the length of the symbols $S_0$ and $S_1$ is not known. For example, if the hypothesized OVSF code has a length of 4 chips and the actual OVSF code has a length of 8 chips, then each transmitted symbol lasts two hypothesized OVSF codes. As another example, if the actual OVSF code has a length of 16 chips, then each transmitted symbol lasts four hypothesized OVSF codes. With the invention, partial processing is performed using the hypothesized OVSF code and the intermediate results are later combined to provide the desired outputs.

For the simple example described above, the same pilot estimates, $\alpha$ and $\beta$, are used for all four symbols $Y_{00}$, $Y_{01}$, $Y_{10}$, and $Y_{11}$. However, it is also possible to use the most updated pilot estimates available at the time of the symbol being processed. In this case, instead of using a single set of $\alpha$ and $\beta$, four sets $\alpha_{00}$ and $\beta_{00}$ through $\beta_{11}$ and $\beta_{11}$ can be used to process the symbols $Y_{00}$ through $Y_{11}$, respectively.

Referring back to FIG. 8, each finger element processes one instance of the received signal to generate the partially processed symbols for that finger. Specifically, each finger despreads the received samples, decovers the despread samples using the hypothesized OVSF code, and demodulates the decovered symbols with the pilot estimates to generate the partially processed symbols. The actual OVSF code may be made up of a concatenation of Q appropriately weighted (with either +1 or −1) hypothesized OVSF codes, depending on the pattern of the actual OVSF code. Thus, Q pairs of partially processed symbols are generated by each finger element for each transmitted symbol. For the W-CDMA system, Q can be 1, 2, 4, ..., or 128, depending on relationship between the actual and hypothesized OVSF codes: Each pair of partially processed symbols thus corresponds to a portion of the transmitted symbol (for Q=2, 4, ... or 128) or the entire transmitted symbol (for Q=1). Each finger element computes the Q pairs of partially processed symbols as $(\alpha^*Y)$ and $(\beta Y^*)$, with one pair of partially processed symbols generated for each hypothesized OVSF code length.

For data transmission received from one base station, the same hypothesized OVSF code is used for all assigned finger elements. As noted above, for data transmissions received from multiple base stations and covered with different actual OVSF codes, different hypothesized OVSF codes may be used to decover the received samples. For both cases, the partially processed symbols from all assigned finger elements are combined to generate the intermediate results.

The partially processed symbols from all assigned finger elements are then provided to combiner 732 and appropriated weighted and combined into combined symbols, which represent the intermediate results. Specifically, the partially processed symbols from all assigned finger elements for each hypothesized OVSF code length are scaled and combined to generate the intermediate results for that hypothesized OVSF code length. Again, Q pairs of intermediate results, $(\overline{\alpha^*Y_0})$ and $(\overline{\beta Y_0^*})$ through $(\overline{\alpha^*Y_{Q-1}})$ and $(\overline{\beta Y_{Q-1}^*})$, are generated for each transmitted symbol. The intermediate results are then provided to the next processing unit or stored.

Once the actual OVSF code is known, the intermediate results can be retrieved and further processed, if necessary, to obtain the recovered symbols. As an example, if the physical channel was processed using a hypothesized OVSF code $C_{2,0}$=1,1 and the actual OVSF code is $C_{4,1}$=1,1,−1,−1, then the intermediate results are retrieved, appropriately inverted as defined by the actual OVSF code, and integrated over the length of the actual OVSF code to obtain the recovered symbols. For the above example, the second pair of intermediate results is inverted to account for the inversion in the second half of the $C_{4,1}$ code. The first set of intermediate results, corresponding to $(\overline{\alpha^*Y_0})$ through $(\overline{\alpha^*Y_{Q-1}})$, from the Q pairs are combined to obtain the term $(\overline{\alpha^*X})$. Similarly, the second set of intermediate results, corresponding to $(\overline{\beta Y_0^*})$ through $(\overline{\beta Y_{Q-1}^*})$, from the Q pairs are combined to obtain the term $(\overline{\beta X^*})$. These terms are then combined as shown in equations (5) and (6) to obtain the recovered symbols. Referring to FIG. 7, the processing of the intermediate results can be performed by controller 740, by circuitry within combiner 732, or by other circuitry not shown in FIG. 7.

The processing units described herein (e.g., multipliers 814, accumulators 816, pilot processors 818, data recovery element 830, controller 740, and others) can be implemented in various manners such as an application specific integrated circuit (ASIC), a digital signal processor, a microcontroller, a microprocessor, or other electronic circuits designed to perform the functions described herein. Also, the processing units can be implemented with a general-purpose or specially designed processor operated to execute instruction codes that achieve the functions described herein. Thus, the processing units described herein can be implemented using hardware, software, or a combination thereof.

The memory unit can be implemented memory technologies including, for example, random access memory (RAM), Flash memory, and others. The memory unit can also be implemented with storage element such as, for example, a hard disk, a CD-ROM drive, and others. Various other implementation of the memory unit are possible and within the scope of the present invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present a invention is not intended to be limited to the embodiments shown herein but is to be accorded the widest scope consistent with the principles and novel features disclosed herein.

What is claimed is:

1. A method for recovering data transmitted on a physical channel, wherein a channelization code used for the physical channel is not known at the time of the data recovery, the method comprising:

receiving and processing a modulated signal to provide received samples;

selecting a hypothesized channelization code for processing the physical channel;

processing the received samples with the hypothesized channelization code to generate partially processed symbols;

storing intermediate results representative of the partially processed symbols;

determining an actual channelization code used for the physical channel;

processing the intermediate results in accordance with the actual channelization code and the hypothesized channelization code to provide final results, wherein the processing the intermediate results includes partitioning the intermediate results into sets of intermediate results, scaling each intermediate result in a particular set with a respective scaling factor determined by the actual channelization code and the hypothesized channelization code, and combining the scaled results for each set to obtain a final result for the set.

2. The method of claim 1, wherein the processing the received samples includes decovering the received samples with the hypothesized channelization code to generate decovered symbols, and demodulating the decovered symbols with pilot estimates to generate the partially processed symbols.

3. The method of claim 2, wherein the demodulating with the pilot estimates includes performing a dot product between the decovered symbols and the pilot estimates, and performing a cross product between the discovered symbols and the pilot estimates, and wherein the partially processed symbols are derived based on results of the dot and cross products.

4. The method of claim 2, wherein the pilot estimates are generated by despreading the received samples with a pilot despreading code, and integrating the despread pilot samples over a length of the pilot despreading code to obtain pilot symbols that are then used to generate the pilot estimates.

5. The method of claim 4, wherein the pilot estimates are generated by interpolating or extrapolating the pilot symbols.

6. The method of claim 1, further comprising:

combining partially processed symbols from a plurality of demodulation elements assigned to process the physical channel to generate the intermediate results.

7. The method of claim 1, wherein the scaling factor is either +1 or −1.

8. The method of claim 1, wherein the hypothesized channelization code is a member of a set of channelization codes that may be used to generate the actual channelization code, and wherein the hypothesized channelization code has a length that is shorter or equal to that of the actual channelization code.

9. The method of claim 8, wherein the hypothesized channelization code can be used to generate all channelization codes in the set.

10. The method of claim 8, wherein the hypothesized channelization code is an orthogonal variable spreading factor (OVSF) code.

11. The method of claim 10, wherein the hypothesized OVSF has a largest spreading factor among the channelization codes in the set.

12. The method of claim 10, wherein the hypothesized OVSF code has a spreading factor of four or greater.

13. The method of claim 10, wherein the hypothesized OVSF code and an actual OVSF code each has a spreading factor ranging from four to 512.

14. The method of claim 1, wherein the physical channel has a variable data rate.

15. The method of claim 1, further comprising:

selectively combining the final results from multiple symbol periods to obtain a recovered symbol, wherein each symbol period corresponds to duration of the actual channelization code.

16. The method of claim 15, wherein the selectively combining is performed in a manner complementary to an encoding performed in accordance with a space time block coding transmit antenna diversity (STTD) mode.

17. A receiver unit operative to process a physical channel in a CDMA communications system, comprising:

a receiver operative to receive a modulated signal and provide received samples indicative of data transmitted on the physical channel;

at least one demodulator element coupled to the receiver, each demodulator element including a data processing unit operative to receive and process the received samples in accordance with a hypothesized channelization code to provide decovered symbols;

a memory unit operative to store intermediate results representative of the decovered symbols from the at least on demodulator element; and a processor operative to receive and process the intermediate results in accordance with an actual channelization code and the hypothesized channelization code to generate final results, wherein each demodulator element further includes:

a pilot processing unit operative to receive and process the received samples to generate pilot estimates, and a data recovery element coupled to the pilot processing unit and the data processing unit, the data recovery element operative to receive the pilot estimates and the decovered symbols and generate partially processed symbols; and wherein the processor processes the intermediate results by partitioning the intermediate results into sets of intermediate results, scaling each intermediate result in a particular set with a respective scaling factor determined by the actual channelization code and the hypothesized channelization code, and combining the scaled results for each set to obtain a final result for the set.

18. The receiver unit of claim 17, wherein the data recovery element is operative to receive and demodulate the decovered symbols with the pilot estimates to generate the partially processed symbols.

19. The receiver unit of claim 18, further comprising:

a combiner coupled to the at least one demodulator element and operative to receive and combine partially processed symbols from one or more assigned demodulator elements to generate the intermediate results.

* * * * *